Patented Oct. 21, 1952

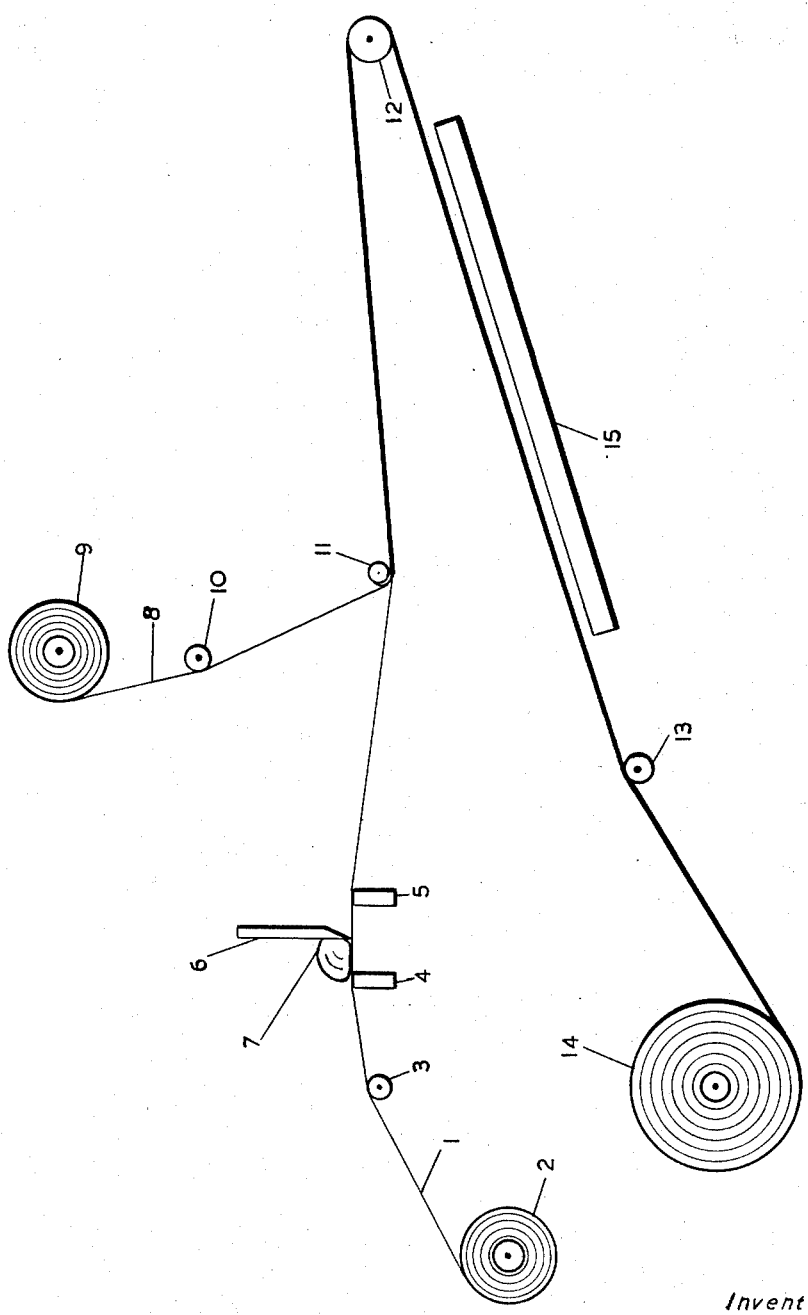

2,614,954

UNITED STATES PATENT OFFICE 2,614,954

COMPOSITE FABRICS BONDED TOGETHER WITH POLYVINYL CHLORIDE

Henry Ewing and Albert Mellor, Spondon, near Derby, England, assignors to Celanese Corporation of America, a corporation of Delaware Application September 21, 1948, Serial No. 50,326
In Great Britain September 23, 1947

3 Claims. (Cl. 154—46)

This invention relates to coatings, etc., and has as its particular object to provide coatings having a basis of polyvinyl chloride of improved adhesion, on materials having a basis of cellulose acetate and like cellulose derivatives.

Polyvinyl chloride, particularly when of high molecular weight and insoluble in acetone, does not readily adhere to cellulose acetate, and extensive trials involving the use of numerous different types of plasticiser for polyvinyl chloride and of various resins have hitherto failed to provide satisfactory adhesion. We have now found that polyvinyl chloride plasticised with a plasticiser that is a di-carboxylic acid di-ester and a solvent for the polyvinyl chloride when hot, can be caused to adhere firmly to cellulose acetate.

The best results have been obtained by the use of plasticisers that are phthalic acid di-esters of cyclo-aliphatic alcohols. Among such plasticisers the neutral phthalates of cyclo-hexanol and the methyl cyclo-hexanols and other hydroxy-cyclohexanes are of particular value. The neutral phthalate of furfuryl alcohol can also be employed, but less advantageously, since its solvent power for cellulose acetate is for some purposes higher than is desirable, leading to the danger of unduly softening the cellulose ester at elevated temperatures. Methyl phthalyl ethyl glycollate suffers from the same disadvantage, besides giving poorer adhesion than the cyclo-aliphatic diesters possibly on account of inferior solvent power for polyvinyl chloride. Butyl phthalyl butyl glycollate and dibutyl phthalate which are of poor compatibility with cellulose acetate give coatings of still poorer adhesion, and the same is true with diphenyl phthalate. Apart from phthalic acid esters, the di-esters of other dicarboxylic acids in which preferably the carboxyl groups are separated by not more than about 3 carbon atoms can be used. For example, we may employ the cyclo-hexyl, methyl cyclo-hexyl and furfuryl esters of oxalic acid, malonic acid, succinic acid and glutaric acid. The oxalic acid esters of cyclohexanol and the methyl cyclohexanols give very strong films and coatings but a disadvantage of their use in a dope is excessive shrinkage of the coated material. This may be made use of where a tautening effect is required or may be mitigated by suitable formulation of the dope. Tricresyl phosphate and all the other phosphoric esters tried have given very poor adhesion. This is true even of tributyl phosphate, which has a high affinity for polyvinyl chloride and dissolves cellulose acetate at 100° C. We have not obtained good adhesion with any ester of a mono-basic acid. Often it appears an advantage to use esters which are compatible with cellulose acetate, for example up to at least 5 or 10 parts per 100 parts of cellulose acetate. This is the case with the cyclo-hexanol and methyl cyclohexanol phthalates mentioned above.

The esters specifically mentioned above are neutral esters of dicarboxylic acids with monohydroxy compounds. We have also found that esters belonging to the class of polyesters obtainable from dibasic acids and polyhydroxy compounds (including di-hydroxy compounds) can also be used to plasticise the polyvinyl chloride and obtain good adhesion between the latter and cellulose acetate. The polyester used should preferably have a molecular weight of less than 2000 and may be of much lower molecular weight, e. g. below 1200. As examples of such polyesters may be mentioned those obtainable from glycerol or glycols or polyglycols on the one hand (e. g. ethylene glycol, trimethylene glycol, tetramethylene glycol, hexamethylene glycol, diethylene glycol and triethylene glycol), and di- or polymethylene dicarboxylic acids on the other hand (e. g. succinic acid, glutaric acid, adipic acid and sebacic acid). Preferably the sum of the carbon atoms in the glycol molecule together with those in the acid molecule should not exceed 12 or 16. The resinous plasticiser sold under the trade name Paraplex G25 appears to be a product of this kind derived from sebacic acid and glycol and is very suitable for the purposes of the invention.

The polyesters may be made by heating one molecular proportion of the acid with substantially more than one molecular proportion of the glycol and distilling off water and glycol until a product of the desired molecular weight is obtained.

A further type of polyester which has been found to give good adhesion is the oil modified glycerol-phthalic acid condensation product for example a castor-oil-modified glycerol-phthalic acid condensation product. However, these tend to impart to the material an odour which is undesirable in some cases.

Plasticisers of the kind referred to above as imparting adhesion, if used as the sole plasticiser in a polyvinyl chloride composition give films and coatings which are somewhat limp and insufficiently resilient for some purposes. To give more resilient films or coatings these plasticisers may be used in conjunction with plasticisers having relatively long inactive chains attached to active groups as in the esters of polycarboxylic acids (including dicarboxylic acids) with saturated alcohols of at least 6 carbon atoms or in the esters of polyhydric alcohols (including di-hydric alcohols) with saturated monocarboxylic acids of at least 6 carbon atoms. Examples of such esters are di-amyl, di-hexyl and di-octyl phthalates, tri-octyl phosphate, and di-octyl sebacate. Particularly valuable for this purpose are long chain or moderately long chain di-esters of poly-glycols, especially the di-hexoate, di-2-ethyl-hexoate and di-2-ethyl-butyrate of triethylene glycol.

The proportion of total plasticiser may be within wide limits, for example from 60 to 175% based on the weight of the polyvinyl chloride. From 5% to 25 or 35% of the total plasticiser may be of the plasticiser adapted to impart resilience though it is often unnecessary for this to exceed 12 or 15% to obtain sufficient resilience. The proportion of plasticiser imparting resilience is preferably kept to the minimum yielding the desired degree of resilience as this plasticiser may diminish the adhesion between the plasticised polyvinyl chloride and the cellulose acetate.

Polyvinyl chloride plasticised with a plasticiser of the kind referred to above as imparting adhesive properties for cellulose acetate, with or without the addition of plasticiser of the kind which imparts improved resilience, may be applied to surfaces of cellulose acetate in various ways. Thus, for example, fabrics, films, ribbons or threads of the cellulose ester may be impregnated or coated with a dope comprising a solution of the plasticised polyvinyl chloride in a volatile solvent which is subsequently evaporated from the coated material; self-supporting films of the plasticised polyvinyl chloride may be bonded to fabrics, films or ribbons of the cellulose ester under pressure at a suitably elevated temperature; and ribbons and threads of the cellulose ester may have a coating of plasticised polyvinyl chloride extruded upon them. When using a dope containing a volatile solvent, this must not, of course, dissolve or unduly swell the cellulose acetate. It need not be when alone a solvent for polyvinyl chloride provided that it can form a solvent therefor in conjunction with the plasticiser. Suitable solvents can be obtained by diluting methyl ethyl ketone with a higher ketone such as methyl isobutyl ketone. It is not essential however to have the polyvinyl chloride in true solution in the dope; it may be merely dispersed in the dope in such a way that the dope is suitable for coating purposes. The polyvinyl chloride and plasticiser together may constitute from 20 to 35% of the dope. The dope may contain dyes, white or coloured pigments, or other effect materials and stabilisers for the polyvinyl chloride.

The polyvinyl chloride is advantageously of such high molecular weight as to be insoluble in acetone or in methyl-ethyl ketone. Such polyvinyl chlorides are of particular value by reason of their mechanical properties and their resistance to the liquids commonly used for dry cleaning purposes. They are conveniently those made by emulsion polymerisation processes and isolated as powders by spray-drying.

One of the most important applications of the invention is in bonding a layer of textile fabric consisting of or containing cellulose acetate fibres to another layer of textile fabric. Thus two cellulose acetate fabrics may be bonded together by means of the plasticised polyvinyl chloride of the invention or a cellulose acetate textile fabric may be bonded to a textile fabric of another kind to which the polyvinyl chloride adheres. Such other textile fabrics include fabrics of cotton fibres or regenerated cellulose fibres which, without having substantial affinity for the polyvinyl chloride composition have an external structure capable of affording an anchorage for a coating of the polyvinyl chloride composition. The textile fabrics may be of various constructions; for example they may be of continuous filament yarns or of staple fibre yarns and they may be either woven or knitted, e. g. of plain or fancy weave or of plain or fancy warp or circular knit. Again various combinations of fabrics may be used to obtain duplex fabrics suitable for a wide variety of uses. Examples of useful combinations of fabrics are:

1. Two layers of plain or fancy woven fabric of cellulose acetate yarns.
2. Two layers of cellulose acetate warp knitted fabric.
3. One layer of cellulose acetate woven fabric and one layer of cellulose acetate knitted fabric.
4. One layer of cellulose acetate woven or knitted fabric and one layer of a cotton fabric or a fabric (preferably of light weight) of regenerated cellulose yarns made by stretching cellulose acetate yarns in steam or hot water and substantially completely saponifying.
5. One layer of a cotton or regenerated cellulose fabric of the kind mentioned under (4) having on each side a layer of a cellulose acetate woven or knitted fabric or having a cellulose acetate woven fabric on one side and a cellulose acetate knitted fabric on the other.

The various fabrics of the composite materials may be coloured as desired, for example uniformly as by dyeing or locally as by printing or by using suitably coloured yarns in their construction. By using a knitted fabric in combination with a woven fabric it is possible to make composite materials having the appearance of a knitted fabric and with the dimensional stability associated with a woven fabric.

Suitable apparatus for bonding together two such fabrics comprises draw-off rolls for the two fabrics, a dope box or equivalent device for applying a coating of dope to one of the fabrics, a doctor blade for controlling the thickness of the coating, a radius bar where the uncoated fabric is brought into contact with the coated surface of the other fabric, a guide-roll round which the composite fabric so formed passes to the take-up roll, and heating means between the guide-roll and the take-up roll, for evaporating solvent from the coating of the dope and gelling the polyvinyl chloride.

The drawing shows in diagrammatic form an apparatus of this kind. In this apparatus one of the fabrics 1 is fed from a draw-off roll 2 via a guide roll 3 past a dope-applying device comprising a pair of parallel bars 4 and 5 over and in contact with which the fabric passes, and a doctor blade 6. The doctor blade 6 is arranged to doctor the fabric at a point between the bars 4 and 5 and is adjustable towards and away from the bars. The dope applying arrangement is such that contact of the doctor blade with an upstanding portion of the fabric, e. g. a seam, merely depresses the fabric between the bars 4 and 5 and the fabric returns to its normal position as soon as the projection has passed. Dope 7 is fed to fabric at the rear side of the doctor blade 6 as required. After leaving the dope-applying means the fabric 1 meets the second fabric 8 fed from a draw-off roll 9 via a guide roller 10. The two fabrics with the dope layer between them then pass round a radius bar 11 which is curved slightly in the direction of its length and serves to press the fabrics together while maintaining their full width and avoiding lengthwise ripples. From the radius bar the two fabrics pass via guide rolls 12 and 13 to a take-up roll 14. Between the rolls 12 and 13 is disposed an electrically heated plate 15 adapted to heat the fabric passing between the guide rolls 12 and 13.

As an example of this application of the invention two woven fabrics of cellulose acetate dyed in contrasting colours were bonded together, using the apparatus described, by means of a dope having the following composition, all the parts being by weight:

40 parts acetone-insoluble emulsion-polymerised spray-dried polyvinyl chloride
50 parts di-(methyl-cyclo-hexyl)-phthalate
20 parts triethylene glycol di-2-ethyl-butyrate
200 parts of a 40% solution of methyl isobutyl ketone in methyl ethyl ketone The dope was applied to the upper surface of one of the fabrics; the other fabric was brought into contact with the coated surface during passage round the radius bar, and under the tension applied by the take-up roll the two fabrics were bonded together; the composite fabric so formed was carried past the heating element where the solvent was evaporated and the coating gelled, and was then wound up.

The di-(methyl-cyclo-hexyl)-phthalate may be that derived from any one of the isomeric methyl cyclo-hexanols or from a mixture of isomeric methyl cyclo-hexanols e. g. the mixture obtainable by hydrogenating coal tar cresol.

From the composite fabric formed in this way, attractive ribbons and shapes for use in the millinery trade were cut, a hot cutter being used so as to seal the edges.

It is not essential to bond the fabrics together continuously with the coating of one of them, as described above, and in some cases it is more convenient to coat one of the fabrics, and to bond this coated fabric to the other fabric in the course of a separate operation, for example by passing the fabrics together between heated calender rolls. Another alternative is to form a self-supporting film of the plasticised polyvinyl chloride and to use this in bonding together two cellulose acetate fabrics under heat and pressure. Instead of a self-supporting film a fabric of cellulose acetate or cellulose acetate in admixture with cotton or other non-thermoplastic textile material may be coated on both sides with the dope, for example by a padding process, and the coated fabric which has received a heat treatment to drive off the solvent and gel the polyvinyl chloride may be used as an interlining in joining two cellulose acetate fabrics. A further method is to extrude sheets of the plasticised polyvinyl chloride, in the absence of any volatile solvent, between two cellulose acetate fabrics on a calender and to pass the resulting three-layer assembly between the hot calender rolls to bond the fabrics together. The temperature necessary to bond a film or coating of the plasticised polyvinyl chloride in the absence of volatile solvent to a cellulose acetate fabric need be no higher than normal ironing temperature for cellulose acetate fabrics e. g. 150° to 180° C., so that the bonding can be done without damage to the surface of the cellulose acetate.

An important application of the invention is in the manufacture of laminated fabric articles such as semi-stiff collars, cuffs and shirt fronts. These may comprise various combinations of two or more fabrics, for example combinations such as those outlined above. According to one method of making such collars in accordance with the invention, two suitably shaped blanks are cut from a sheet of shirting fabric, which may be composed entirely of cellulose acetate fibres or may contain cellulose acetate fibres in admixture with cotton or other non-thermoplastic textile fibre, for example regenerated cellulose, coated on one side with the plasticised polyvinyl chloride of the invention. The coating may be carried out on a spreading machine using the dope specified above, the machine having provision for heating the coated fabric to drive off volatile solvent and gel the coating. The coated blanks are sewn together to form the collar with their coated surfaces in contact. Bonding may be effected by ordinary ironing. Collars made in this way have been found to possess a very desirable combination of stiffness and resilience and to withstand washing very well. They may be ironed in the same way as ordinary cellulose acetate fabrics, but without starching. If washed in hot water some softening of the polyvinyl chloride interlayer occurs which probably facilitates washing; after ironing and allowing to cool the collar will be found to have regained the desired degree of stiffness. If desired both of the blanks may be of warp knitted fabric, or one may be of warp knitted fabric and the other of woven fabric. When a somewhat stiffer and heavier collar is required an interlining of cellulose acetate or mixed cellulose acetate/cotton fabric coated on both sides with the plasticised polyvinyl chloride may be used to bond two outer layers of cellulose acetate fabric together, the method being similar to that commonly used in making semi-stiff collars with an interlining of mixed cellulose acetate/cotton fabric, except that, by the process of the present invention, no solvent or potential solvent is required. This is a most valuable simplification in the manufacture of semi-stiff collars. Other methods such as are described above for bonding two fabrics together by the method of the invention can be applied in making semi-stiff collars, for example instead of the interlining of fabric coated on both sides with plasticised polyvinyl chloride, a self-supporting film of the plasticised polyvinyl chloride can be used.

Semi-stiff collars can also be made up from a duplex fabric of two layers of shirting fabric containing cellulose acetate yarns, bonded together by the plasticised polyvinyl chloride as in the above example, the duplex fabric being cut and sewn to the appropriate shape as though it were a simple linen fabric. Collars made in this way have been found very satisfactory in regard to ease of manufacture, appearance, resilience and the maintenance of shape, resilience and appearance after repeated launderings. If desired semi-stiff collars can be made by sewing together two layers of a duplex fabric, the latter consisting of two layers of fabric, made of or containing cellulose acetate fibres, and bonded by the plasticised polyvinyl chloride; the duplex fabric for this purpose may consist of one layer of cellulose acetate woven shirting fabric or warp knitted fabric and one layer of a light-weight woven fabric of cellulose acetate filaments or regenerated cellulose filaments, particularly regenerated filaments made by stretching cellulose acetate filaments and completely saponifying them as hereinbefore mentioned.

A warp knitted fabric of cellulose acetate may for example be bonded to a light-weight woven fabric of cellulose acetate or regenerated cellulose of the type mentioned above by means of the following composition:

Acetone-insoluble emulsion-polymerised spray-dried polyvinyl chloride 100 parts
Di-(methyl cyclo-hexanol)-phthalate 100 parts
Mixture of methylethyl ketone with di-isobutyl ketone 400 parts Two layers of bonded fabric may be formed into a collar by sewing.

Up to 15% of the di-(methyl cyclo-hexanol)-phthalate may be replaced by triethylene-glycol di-(2-ethyl-butyrate) in order to impart greater resiliency to the polyvinyl chloride bonding material. Again, the di-(methyl cyclo-hexanol)-phthalate may be replaced by a castor-oil modified glycerol-phthalic anhydride condensation product or by Paraplex G25.

Other laminated fabric articles that can be made by the methods of the invention are neckties, belts, brassières, hat-shapes, sweat-bands for hats, water-proof and shower-proof clothing, table covers, shower-bath curtains, hand-bags and sponge-bags. It will be appreciated that a layer of the plasticised polyvinyl chloride between two layers of cellulose acetate fabric gives a high degree of resistance to penetration by water. In making articles requiring some degree of elasticity, e. g. hat-shapes, brassières and sweat-bands it is of advantage to use fabrics having some degree of structural elasticity, e. g. knitted fabrics, woven fabrics cut on the bias and crepe fabrics. In this way it is possible to take advantage of the elasticity of the polyvinyl chloride interlayer. Similarly where a somewhat elastic coated fabric is required whether for use as an interlining or for other purposes, it is of advantage to use such a structurally elastic fabric. Brassières can be made according to the invention by bonding together and shaping between hot male and female moulding members two blanks cut from cellulose acetate fabric coated on one side with the plasticised polyvinyl chloride. The fabric is preferably one having structural elasticity to allow it to conform to the shape of the mould, and the temperature should be insufficient to fuse the cellulose acetate.

In bonding together coated fabrics according to the invention the simplest method of supplying the necessary heat is by direct contact of the material with a hot surface, e. g. the surface of a calender roll, press platen, mould member or flat-iron. Other methods of heating may be used however. Thus the heat may be generated within the polyvinyl chloride coating by subjecting the assembly to a high frequency alternating electric field. Using this method, by virtue of the high loss factor of polyvinyl chloride compared with cellulose acetate, the polyvinyl chloride can be raised to a considerably higher temperature than the cellulose acetate. Di-electric heating can also be used in evaporating volatile solvent and gelling the plasticised polyvinyl chloride when this has been applied in the form of a dope. Infra-red heating can be used to evaporate volatile solvent and gel the coating and also to pre-heat coated fabrics immediately before they are bonded together under pressure.

As already indicated, one application of the invention is in bonding cellulose acetate materials to other materials to which the plasticised polyvinyl chloride adheres. Such other materials include materials such as cotton fibres, which without having substantial affinity for the polymer have an external structure capable of affording an anchorage to a coating of the polymer, as well as materials having substantial affinity for the polymer by virtue of their chemical constitution, e. g. polyvinyl chloride-acetate.

The invention has been described with particular reference to the use of cellulose acetate as the cellulose derivative. Other cellulose derivatives having similar solubility properties to cellulose acetate can, however, be used in the same way. Among such esters are cellulose propionate, cellulose acetate-propionate, and cellulose acetate-butyrate. The cellulose derivative materials used may be made of fibres of high tenacity such as are obtainable by stretching cellulose derivative fibre to several or many times its original length for instance in steam or hot water. In this way fibres of tenacity above 2.5 gm. per denier, e. g. 3 to 6 gm. per denier can be obtained. It has proved particularly difficult hitherto to bond such materials to polyvinyl chloride.

Having described our invention, what we desire to secure by Letters Patent is:

1. A composite material comprising two layers of cellulose acetate material bonded together by an interlayer in which the sole polymeric film-forming material is an acetone-insoluble homopolymer of vinyl chloride, said polymer being plasticized with 60–175%, based on the weight of said polyvinyl chloride, of a di-(monomethyl-cyclohexyl)-phthalate, the cycloaliphatic ester being solely responsible for the high adhesion between the cellulose acetate and the polyvinyl chloride.

2. A composite fabric comprising two layers of cellulose acetate material bonded together by an interlayer in which the sole polymeric film-forming material is an acetone-insoluble homopolymer of vinyl chloride, said polymer being plasticized with 55–140%, based on the weight of said polyvinyl chloride, of a di-(monomethyl-cyclohexyl)-phthalate together with 5–35% based on the weight of the polymer of triethylene-glycol di-(2-ethyl-butyrate), the cycloaliphatic ester being solely responsible for the high adhesion between the cellulose acetate and the polyvinyl chloride.

3. A composite material comprising two layers of cellulose acetate bonded together by another layer in which the sole polymeric film-forming material is an acetone-insoluble homopolymer of vinyl chloride, said polymer being plasticized with 60 to 175% based on the weight of said polyvinyl chloride, of a di-(cycloaliphatic)-ester of a dicarboxylic acid in which the two carboxyls are separated by no more than three carbon atoms, the cycloaliphatic ester being solely responsible for the high adhesion between the cellulose acetate and the polyvinyl chloride.

HENRY EWING.
ALBERT MELLOR.

REFERENCES CITED

The following references are of record in the file of this patent:

UNITED STATES PATENTS

| Number | Name | Date |
|---|---|---|
| 2,075,106 | Fordyce et al. | Mar. 30, 1937 |
| 2,263,015 | Seel | Nov. 18, 1941 |
| 2,301,959 | Lanning | Nov. 17, 1942 |
| 2,349,414 | Ferrer | May 23, 1944 |
| 2,498,453 | Schaerer | Feb. 21, 1950 |
| 2,500,891 | Alexander | Mar. 14, 1950 |
| 2,517,646 | Ewing | Aug. 8, 1950 |

FOREIGN PATENTS

| Number | Country | Date |
|---|---|---|
| 369,945 | Great Britain | Mar. 24, 1932 |